(12) United States Patent
Lu et al.

(10) Patent No.: US 9,712,383 B2
(45) Date of Patent: Jul. 18, 2017

(54) DEVICE ABSTRACTION IN AUTONOMOUS WIRELESS LOCAL AREA NETWORKS

(71) Applicant: Aruba Networks, Inc., Sunnyvale, CA (US)

(72) Inventors: Hao Lu, Santa Clara, CA (US); Pradeep Iyer, Cupertino, CA (US); Yan Liu, Milpitas, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 481 days.

(21) Appl. No.: 14/029,695

(22) Filed: Sep. 17, 2013

(65) Prior Publication Data

US 2015/0032861 A1 Jan. 29, 2015

Related U.S. Application Data

(63) Continuation of application No. 13/174,294, filed on Jun. 30, 2011, now Pat. No. 8,539,055.

(51) Int. Cl.
*G06F 15/16* (2006.01)
*H04L 12/24* (2006.01)
(Continued)

(52) U.S. Cl.
CPC ...... *H04L 41/0803* (2013.01); *H04L 61/2007* (2013.01); *H04L 61/2038* (2013.01);
(Continued)

(58) Field of Classification Search
None
See application file for complete search history.

(56) References Cited

U.S. PATENT DOCUMENTS 6,397,260 B1 * 5/2002 Wils .................. H04L 45/00
370/401
6,601,093 B1 7/2003 Peters
(Continued)

OTHER PUBLICATIONS

U.S. Appl. No. 13/174,294, Non Final Office Action, mailed Dec. 5, 2012.
(Continued)

*Primary Examiner* — Viet Vu
*Assistant Examiner* — James Edwards
(74) *Attorney, Agent, or Firm* — Hewlett Packard Enterprise Patent Department

(57) ABSTRACT

According to embodiments of the present disclosure, a managed network device assigns to itself an IP address, in absence of a DHCP service, in a link local address space within a wireless network. The system further responds to a network frame received from another device based on the assigned IP address in the link local address space. The network frame can be a network traffic frame, a control path frame, and/or a management frame. The control path frame comprises a source IP address and a destination IP address that correspond to internal IP addresses in the link local address space that are self-assigned by managed network devices. The management frame comprises the self-assigned internal IP address for the managed network device, and provides for management of managed network devices in the wireless network through a single IP address when a virtual controller is configured for the wireless network.

20 Claims, 6 Drawing Sheets

(51) Int. Cl.
*H04L 29/12* (2006.01)
*H04W 8/28* (2009.01)
*H04W 8/26* (2009.01)

(52) U.S. Cl.
CPC ........... H04L 61/2092 (2013.01); *H04W 8/26* (2013.01); *H04W 8/28* (2013.01)

(56) References Cited

U.S. PATENT DOCUMENTS

| | | | |
|---|---|---|---|
| 7,657,626 B1* | 2/2010 | Zwicky | G06Q 30/02 705/51 |
| 7,860,978 B2 | 12/2010 | Oba et al. | |
| 8,254,347 B2* | 8/2012 | Bejerano | H04W 48/20 370/331 |
| 8,339,991 B2* | 12/2012 | Biswas | H04L 41/04 370/254 |
| 8,437,320 B2* | 5/2013 | Tamura | H04L 63/0428 370/338 |
| 2003/0026230 A1 | 2/2003 | Ibanez et al. | |
| 2004/0044908 A1* | 3/2004 | Markham | H04L 63/0272 726/28 |
| 2004/0083306 A1 | 4/2004 | Gloe | |
| 2004/0215752 A1* | 10/2004 | Satapati | H04L 29/12386 709/223 |
| 2006/0218257 A1 | 9/2006 | Kaibe | |
| 2006/0235997 A1* | 10/2006 | Munirajan | H04L 29/12264 709/245 |
| 2007/0030857 A1* | 2/2007 | Fulknier | H04L 45/00 370/401 |
| 2007/0073850 A1* | 3/2007 | Callaghan | G05B 19/05 709/220 |
| 2007/0104139 A1* | 5/2007 | Marinier | H04W 28/18 370/329 |
| 2008/0049752 A1* | 2/2008 | Grant | H04L 12/4641 370/392 |
| 2008/0151899 A1* | 6/2008 | Li | H04L 45/34 370/392 |
| 2008/0165752 A1 | 7/2008 | Perlman | |
| 2008/0205385 A1 | 8/2008 | Zeng et al. | |
| 2008/0261615 A1* | 10/2008 | Kalhan | G01S 5/0009 455/456.1 |
| 2009/0222537 A1 | 9/2009 | Watkins et al. | |
| 2009/0290537 A1* | 11/2009 | Berglund | H04L 12/4633 370/328 |
| 2010/0008302 A1* | 1/2010 | Sayers | H04L 63/0407 370/328 |
| 2010/0251315 A1 | 9/2010 | Ohmae | |
| 2011/0238802 A1 | 9/2011 | Ohara | |
| 2012/0096138 A1* | 4/2012 | Lambert | H04L 29/12254 709/223 |
| 2013/0007233 A1 | 1/2013 | Lv et al. | |

OTHER PUBLICATIONS

U.S. Appl. No. 13/174,294, Notice of Allowance, mailed Jul. 1, 2013.

* cited by examiner

| DEVICE 220 | ADDR TYPE 240 | IP ADDRESS 260 |
|---|---|---|
| Controller 120 | Static IP | 192.168.1.1 |
| Server 130 | Static IP | 192.168.1.4 |
| Access Point 146 | Static IP & Internal IP | 192.168.1.99<br>169.254.a.b |
| Access Point 144 | Internal IP | 169.254.c.d |
| Access Point 142 | Internal IP | 169.254.e.f |
| Network Printer 148 | Static IP | 192.168.1.3 |

FIG. 2

DEVICE ABSTRACTION IN AUTONOMOUS WIRELESS LOCAL AREA NETWORKS

PRIORITY CLAIMS; CROSS-REFERENCE TO RELATED APPLICATIONS

This application is a continuation of and claims the benefit of priority on U.S. patent application Ser. No. 13/174,294, filed Jun. 30, 2011, the entire contents of which are incorporated herein by reference. The applicants hereby rescind any disclaimer of claim scope in the parent applications or the prosecution history thereof and advice the USPTO that the claims in this application may be broader than any claim in the parent application.

BACKGROUND

The present disclosure relates to device abstraction for managed network devices in an autonomous wireless digital network. In particular, the present disclosure relates to managed network devices, such as access points, which are not configured with static Internet Protocol (IP) addresses, self-assigning internal IP addresses in the absence of a Dynamic Host Configuration Protocol (DHCP) service in a wireless digital network.

Wireless digital networks, including wireless networks operating under Institute of Electrical and Electronics Engineers (IEEE) 802.11 standards, are spreading in their popularity and availability. With such popularity, however, come problems of address allocation for managed network device. Specifically, having an IP address allows for configuration and management of a network device by a network user or administrator through a network management user interface. Moreover, each managed network device in a wireless digital network requires an IP address in order to communicate with other managed network devices in the wireless digital network.

Conventionally, the IP address allocation of such managed network devices in an Internet Protocol version 4 (IPv4) network is accomplished through either manual configuration or a DHCP service. First, a network user or administrator can manually configure a static IP address to each of the managed network device in the wireless digital network. Such manual configuration of network devices can be inefficient and prone to errors from, e.g., human inputs.

Second, when a DHCP service is available for the digital wireless network, the managed network device may request an IP address from the DHCP service. A DHCP service automates network-parameter assignment to network devices from one or more DHCP servers. When a network device, which is configured as a DHCP client, connects to a network, the network device sends a broadcast query to a DHCP server requesting necessary information from the DHCP server. The DHCP server manages a pool of IP addresses and information about client configuration parameters, such as default gateway, domain name, the name servers as well as other servers such as time servers, and so on. Upon receiving a valid request from the client device, the DHCP server assigns the network device an IP address, a lease that indicates the length of time the allocation is valid, and other IP configuration parameters, such as the subnet mask and the default gateway. The query is typically initiated by the network device immediately after booting. Moreover, the IP address assignment usually completes before the network device can initiate any IP-based communication with other hosts in the wireless digital network. The DHCP service provides an easy way to assign IP addresses to managed network devices. However, DHCP service is not always available in a wireless digital network and requires additional resource costs.

As an alternative to the DHCP service, Automatic Private Internet Protocol Addressing (APIPA) is used in certain deployment environments to assign IP addresses to clients. With APIPA, client devices can automatically self-configure an IP address and subnet mask when a DHCP server is unavailable. Specifically, the client device uses APIPA to automatically configure itself with an IP address from a reserved range, e.g., the IP address range from "169.254.1.0" through "169.254.254.255." The client device also configures itself with a default class B subnet mask of "255.255.0.0." The APIPA service also checks regularly for the presence of a DHCP server. If it detects a DHCP server on the network, APIPA stops, and the DHCP server replaces the APIPA networking addresses with dynamically assigned addresses. APIPA is typically used in non-routed small scale deployment environments with limited number of clients. However, APIPA is typically used on very limited basis to configure IP addresses for client devices rather than managed network devices, and does not enable a fully operational network.

In addition, stateless address autoconfiguration (SLAAC) is typically used in an Internet Protocol version 6 (IPv6) network. With SLAAC, IPv6 network devices can configure themselves automatically when connected to a routed IPv6 network using Internet Control Message Protocol version 6 (ICMPv6) router discovery messages. When first connected to a network, an IPv6 network device sends to a link-local router a solicitation multicast request for its configuration parameters; if configured suitably, routers respond to such multicast request with a router advertisement packet that contains network-layer configuration parameters. In an IPv6 network, the block "fe80::/10" is reserved for IP address autoconfiguration. However, SLAAC does not provide an internal IP address, which is an IP address within an address space reserved for internal network communications, and which is transparent to a management interface at a host coupled to the managed network device through a wired network. Thus, SLAAC cannot provide a simplified and friendly management user interface for network users and/or administrators. Moreover, SLAAC is not feasible in IPv4 networks.

If IPv6 SLAAC is unsuitable for an application, a wireless digital network may use a stateful configuration with the Dynamic Host Configuration Protocol version 6 (DHCPv6) or hosts may be configured statically. Similarly, the issues with DHCP and static IP configuration discussed above in reference to IPv4 reproduce themselves with DHCPv6 and static IP configuration in an IPv6 network.

BRIEF DESCRIPTION OF THE DRAWINGS

The present disclosure may be best understood by referring to the following description and accompanying drawings that are used to illustrate embodiments of the present disclosure.

FIG. 2 is a diagram illustrating an exemplary IP address assignment according to embodiments of the present disclosure.

DETAILED DESCRIPTION

Figure 1A:
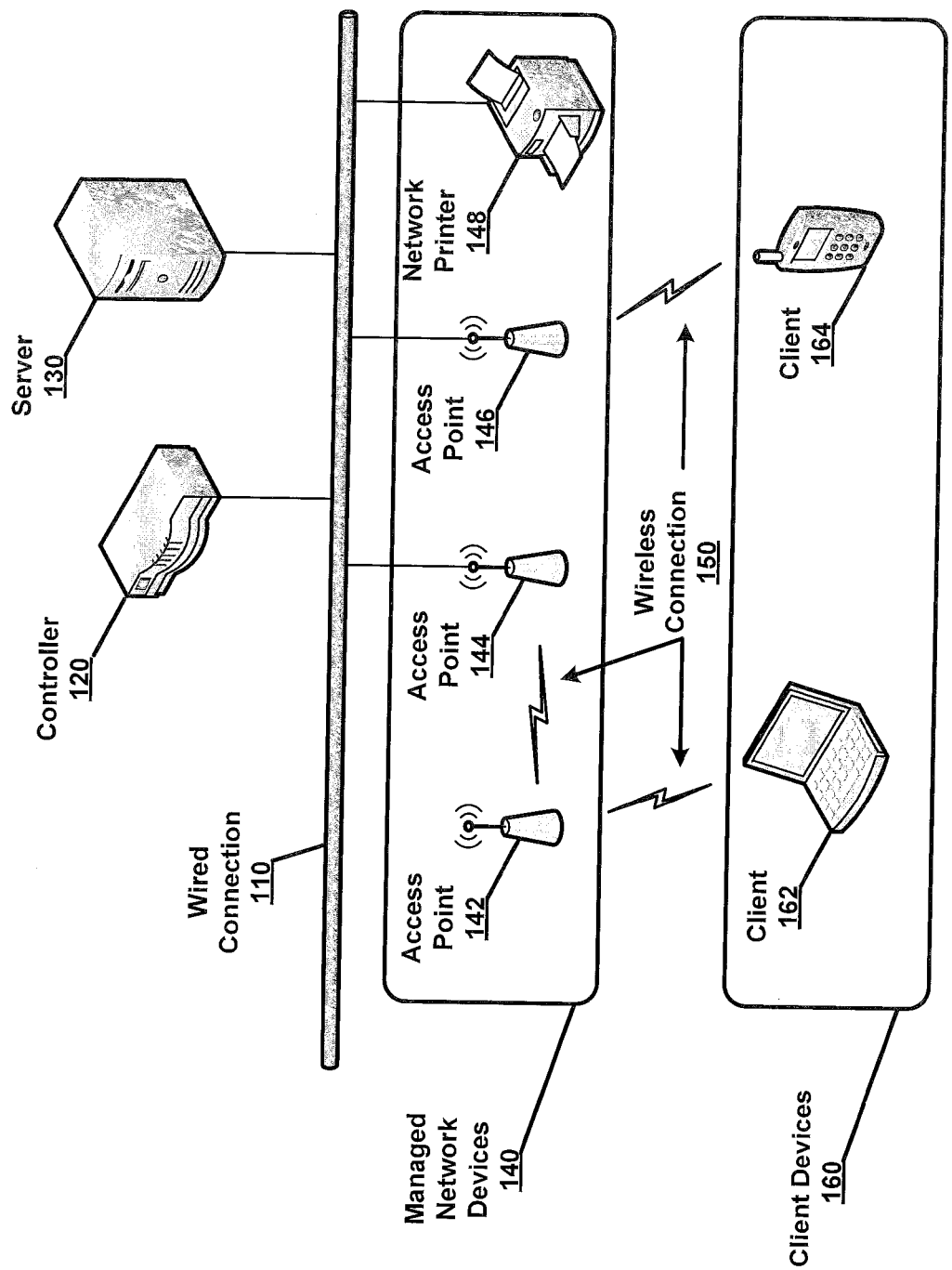
FIG. 1A shows an exemplary wireless digital network environment according to embodiments of the present disclosure.

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to device abstraction for managed network devices in an autonomous wireless digital network, and particularly, to device abstraction for managed network devices, such as access points, which are not configured with static Internet Protocol (IP) addresses, self-assigning internal IP addresses in the absence of a Dynamic Host Configuration Protocol (DHCP) service in a wireless digital network.

Embodiments of the present disclosure provide a solution that requires little to no human intervention to configure and manage network devices in a wireless network. With the solution provided herein, the managed network device determines whether a DHCP service is configured; and if so, the managed network device further determines whether an IP address can be obtained through the DHCP service. If neither a static IP configuration nor a DHCP configuration is available, after a managed network device starts up or reboots, it will assign to itself an IP address in a link local address space within a wireless network, and transmit an IP address conflict check request, which includes its self-assigned IP address, to one or more other managed network devices in the wireless network. If the managed network device detects an address conflict, it will re-assign to itself a different IP address in the link local address space. Once the managed network device determines an IP address that does not conflict with IP addresses of other devices in the wireless network, the managed network device configures the self-assigned IP address as an internal IP address. The IP address may be, but is not limited to, an IPv4 address and/or an IPv6 address. Note that, the link local address space can be reserved for internal network communications, and thus, no additional reservation of any individual address or pool of addresses by the managed network device is required. Moreover, link local address space is typically used for self-autoconfiguration by client devices when DHCP services are not available and manual configuration by a network administrator is not desirable. For example, in an IPv4 network, the link local address space may be an Automatic Private Internet Protocol Addressing (APIPA) space, which includes addresses from 169.254.1.0 to 169.254.254.255; in an IPv6 network, the link local address space may be a Stateless Address Autoconfiguration (SLAAC) address space, which sets aside the block fe80::10 for IP address autoconfiguration.

The managed network device can then respond to network frames received from another network device based on the internal IP address. In some embodiments, the managed network device responds to the network frames by forwarding network traffic from wireless client devices to a wired network, which the managed network device is coupled to. In some embodiments, the managed network device responds to the network frames by responding to a control path frame received from another managed network device which also has a self-assigned internal IP address in the same reserved address space. Specifically, the control path frame includes a source IP address, which corresponds to the other managed network device, and a destination IP address, which corresponds to the internal IP that is self-assigned by the managed network device. In one example, the control path frame is transmitted from a first managed network device to a second managed network device and requests the second managed network device for its software image version and/or type. Upon receiving the request from the first managed network device, the second managed network device transmits another control path frame which includes a response to the request. The first managed network device, after receiving the response from the second managed network device, the first managed network device checks to determine whether its own software image version and/or type is compatible with the ones retrieved from the response frame, which is associated with the second managed network device. In some embodiments, the managed network device responds to the network frames by responding to a management frame from the other network device such that the other network device can configure, monitor, and/or manage the managed network device through a management interface. In one embodiment, the other network device is connected to a wired network and is assigned an IP address outside the reserved address space.

Subsequently, the managed network device participates in a virtual controller election. The managed network device determines whether it is elected to be a virtual controller for the wireless local area network (WLAN). If the managed network device is elected to be the virtual controller for the WLAN, the managed network device further determines whether a virtual controller IP configuration is required based on the WLAN configurations. If so, the managed network device requests and receives for itself an assignment of a virtual controller IP address, which is outside the reserved address space.

After the internal IP address and/or the virtual controller IP address are assigned to the managed network device, the managed network device can start operating, for example, as an access point or a virtual controller in the WLAN. Note that the network is fully operational and the network device is manageable and configurable by a host server upon the completion of this process. Also, note that multiple managed network devices are abstracted from the viewpoint of the host server because the host server can manage multiple network devices through a single IP address and does not need to have the knowledge of the internal IP address of each individual managed network device.

Computing Environment

FIG. 1A shows one exemplary wireless digital network environment according to embodiments of the present disclosure. FIG. 1A includes controller 120 and server 130, both of which are coupled to a wired network connection 110. Also, FIG. 1A includes multiple managed network devices 140, which include, but are not limited to, access point 142, access point 144, access point 146, network printer 148, etc. Some managed network devices, such as access point 144, access point 146, and network printer 148, are coupled to the wired network connection 110. Other managed network devices, such as access point 142, are indirectly coupled to wired connection 110 through wireless connection 150 with a managed network device that has direct access to wired connection 110. Moreover, FIG. 1A includes multiple client devices 160, which include, but are not limited to, client 162 and client 164.

Figure 1B:
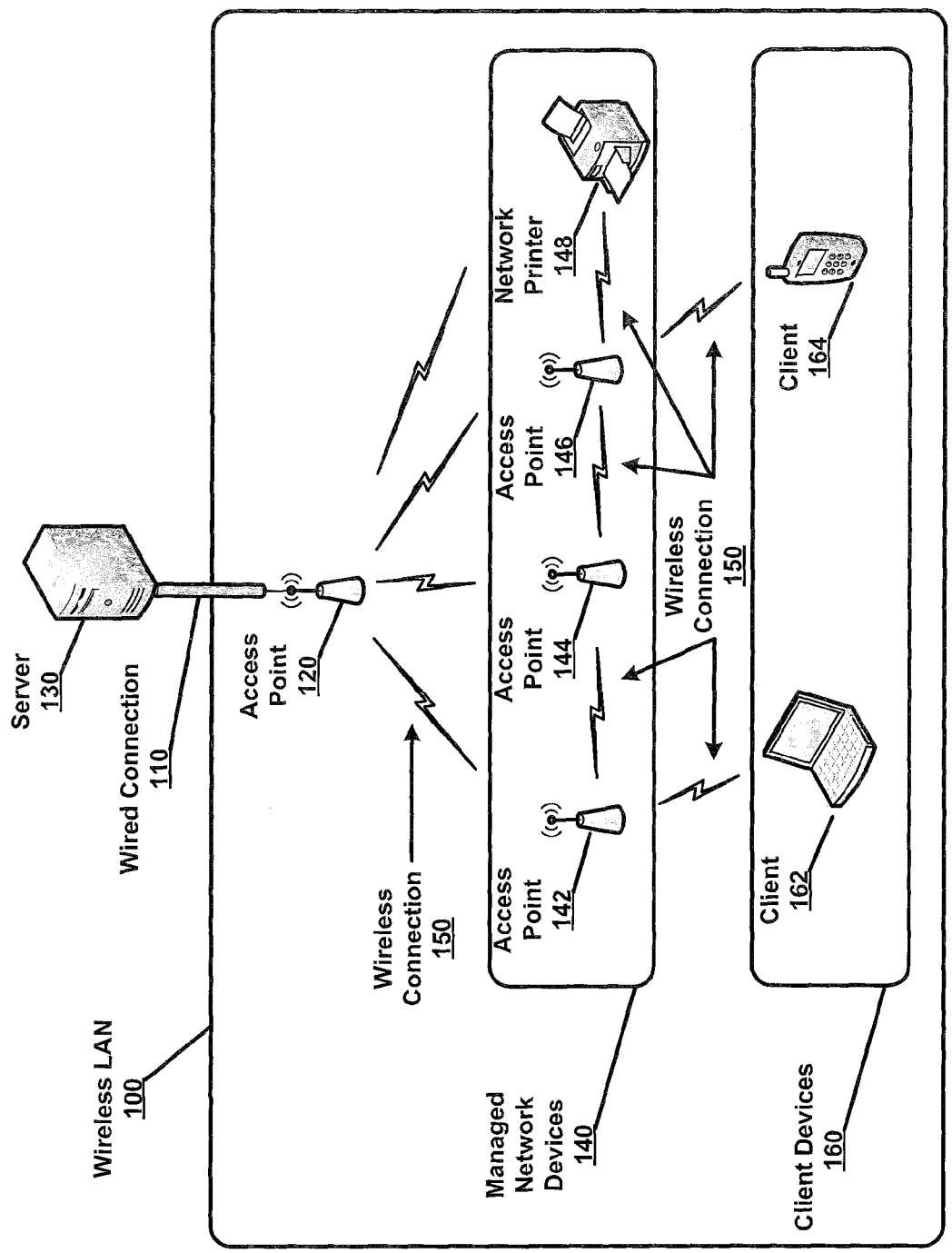
FIG. 1B shows another exemplary wireless digital network environment according to embodiments of the present disclosure.

FIG. 1B shows another exemplary wireless digital network environment according to embodiments of the present disclosure. FIG. 1B includes a wireless local area network (WLAN) 100, a server 130 that is coupled to an access point 120 in WLAN 100 through a wired network connection 110. In this exemplary network environment, all other managed network devices 140 are coupled to access point 120 through wireless connections 150. Managed network devices 140 include, but are not limited to, access point 142, access point 144, access point 146, and network printer 148. Moreover, FIG. 1A includes multiple client devices 160, which include, but are not limited to, client 162 and client 164.

Wired connection 110 can be any type of wired network connections through medium such as Ethernet cables, broadband cables, and/or fiber optics. Wireless connection 150 can be any type of wireless network connection, such as a wireless local area network (WLAN) under Institute of Electrical and Electronics Engineers (IEEE) 802.11 standards, a cellular wireless network, including cellular networks using Worldwide Interoperability for Microwave Access (WiMAX), 3GPP Long Term Evolution (LTE), 4G technologies, etc.

Controller 120 can be any hardware or software module or any combination thereof, which provides one or more of such functionalities as network configuration, network performance monitoring, network security, network fault management, network accounting management, etc. Note that, although only one controller is depicted in FIG. 1A, a network in accordance with the present disclosure may include multiple controllers which collaboratively manage a plurality of managed network devices such as access points.

Server 130 can be any hardware or software module or any combination thereof, which provides any type of network service other than a DHCP service, such as, a file server, a print server, an Intranet server, a mail server, and so on.

As illustrated in FIGS. 1A and 1B, there are typically two types of network devices in a WLAN infrastructure—managed network devices 140 and client devices 160. A "managed network device" generally refers to a network device that serves one or more client devices, and is manageable by a controller or a host server through any type of user interface presented to a network administrator. For example, in FIG. 1A, access points 142, 144, and 146 are manageable and configurable through controller 120.

A "client device," on the other hand, generally refers to any network device that receives service from one or more managed network devices. Client devices are configured and managed by network users and cannot be managed through any controller of the network. For example, in FIGS. 1A and 1B, client device 162 (a laptop) and client device 164 (a smartphone) are both examples of client devices 160. Additionally, client devices 160 can include, but are not limited to, a desktop personal computer, a tablet computer, a personal digital assistant (PDA), a gaming console, and any other device that has the capability to communicate through a wireless network protocol such as IEEE 802.11 protocol. A client device may be fixed, mobile or portable. Note that in wireless networking terminologies, a station, a client device, and a node are often used interchangeably with no strict distinction existing between these terms.

Conventionally, client devices may be assigned internal IP addresses when they have limited network connectivity, i.e. the ability to communicate only with other client devices using internal IP addresses from the same subnet. However, the use of internal IP addresses in such client devices does not allow for device abstraction in the management of such devices by the network administrator, and cannot provide a fully operational network. Embodiments of the present disclosure provide for an improved way of configuring and managing managed network device by network administrators in absence of the DHCP service. The disclosed system provides for not only device abstraction in device management but also a fully operational network.

Device Abstraction via Self-Assigned Internal IP Address in Reserved Address Space FIG. 2 shows a diagram illustrating an exemplary IP address assignment according to embodiments of the present disclosure. In this example, an IPv4 network address allocation is illustrated and a specific network address space is used for internal IP address allocation. However, the disclosed method and system can be used in any version of IP addressing and a different internal IP network address space can be used without departing the spirit of the present disclosure.

In some embodiments, each managed network device of an autonomous wireless network needs a unique IP address to support internal control-path communication between them. However, such unique IP address does not have to be externally reachable or managed. Rather, each managed network device can assign to itself an internal IP address within an address space specifically reserved for internal network communications, e.g. the 169.254.X.X address space in IPv4 network. Specifically, the managed network device can perform a hash of its own media access control (MAC) address and check for IP address conflicts by sending out an Address Resolution Protocol (ARP) request to other managed network devices which self-assign IP addresses within the same reserved address space. If the managed network device detects an IP address conflict, the managed network device will back off and assign to itself another hashed IP address based on its MAC address. By using self-assigned addressing, multiple autonomous managed network devices can be bought up as a single entity after being properly initialized.

A. Initialization State

During the initialization state, in some embodiments, a set of managed network devices are connected to the same Layer-2 network. In some embodiments, the managed network devices can provide certain basic level of service. For example, one of the autonomous managed network device can become a virtual controller (or a master) of the other managed network devices through an automatic election mechanism. Note that, external management systems cannot be supported during the initialization state.

In some embodiments, the managed network device can initially broadcast a default service set identifier (SSID) with open security and DHCP server, to which clients can associate, obtain a DHCP IP address, and open a management interface for the autonomous network via an internal secured unified resource locator (URL). In one embodiment, the management interface is a web-based management interface. In another embodiment, the management interface is a command line management interface. In yet another embodiment, the management interface can employ assistive technologies to provide better accessibility for users with disabilities or impaired abilities.

In some embodiments, using the management interface, the users can create SSIDs for a self-enclosed, private wireless network. An SSID is the name of a WLAN. All wireless devices on a WLAN must employ the same SSID in order to communicate with each other. The SSIDs can support a number of authentication types, such as open authentication, WiFi Protected Access Pre-Shared Key (WPA-PSK) or WiFi Protected Access 2 Pre-Shared Key (WPA2-PSK), Wired Equivalent Privacy (WEP), Institute of Electrical and Electronics Engineers (IEEE) 802.1x to internal Remote Authentication Dial-In User Service (RADIUS) Server, Media Access Control (MAC) authentication to internal RADIUS server, and so on. With these private self-enclosed wireless network, client devices can obtain an IP through DHCP, and use the internal secured URL to access the management UI. However, client devices cannot connect to any other device in the wired network, but they can connect to each other. For illustration purposes only, a client device (e.g., client device 162) connecting to the self-enclosed private network may have the following configuration:

```
Authentication: Open
IP assigned by built-in DHCP server: 172.16.11.250
Gateway: 172.16.11.1
Management URL: https://instant.arubanetworks.com
```

In some embodiments, using the management interface, another type of SSID can be created to bridge traffic between the wireless client devices and the wired network. Each SSID in bridge mode can be mapped to different virtual local area network (VLAN) tags in the wired network. The client devices can take advantage of existing DHCP service in the wired VLAN, or use static IP to communicate with each other and with other devices in the wired network. The SSID can support the same set of authentication types as described above in reference to the management SSID. However, this SSID may not be used for device management. For illustration purposes only, a client device (e.g., client device 164) connecting to SSID in bridge mode may have the following configuration:

```
Authentication: 802.1x to built-in RADIUS server
IP assigned by DHCP server 192.168.1.1: 192.168.1.250
Gateway: 192.168.1.1
VLAN: Default
Management URL: N/A
```

After a custom SSID is created, some, but not all, of the managed network devices can be disconnected from the wireless network and deployed as autonomous wireless managed network device. For example, in FIG. 1A, access point 142 is decoupled from wired network 110 and is coupled through a wireless connection 150 to access point 144, which has wired connection, as a wireless mesh access point. As another example, in FIG. 1B, all access points (including access points 142, 144, and 146) but access point 120 are decoupled from wired network 110.

B. Operational Network Services

The autonomous network can provide these services, and thus enables an operational network with full IP connectivity, using only self-assigned IP addresses for at least the following reasons.

First, the default and private SSIDs only need to provide connectivity between the client devices and the UI, not the wired network. Thus, in embodiments of the present disclosure, by using DHCP relay, DHCP traffic from a wireless client device can be directed to a master access point or a virtual controller of the autonomous network. In some embodiments, the master access point or virtual controller has a built-in DHCP server that assigns client addresses. Moreover, each managed network device such as access point will also resolve any Domain Name System (DNS) query for the internal secured URL (e.g., "instant.arubanetworks.com") to be the self-assigned IP address of the master access point or virtual controller, so that users of the client devices can access the management interface. Further, all managed network devices will perform proxy Address Resolution Protocol (ARP) for all ARP requests from client devices and put the MAC address of the master access point or virtual controller in the response. In some embodiments, any broadcast traffic from client devices other than DHCP and ARP requests are dropped; and thus, all communication between client devices will first reach the master access point or virtual controller. Once the master access point or virtual controller receives the client traffic, it can recognize that the traffic is internal, and forward it to the destination client device using any Layer-2 network forwarding mechanism.

Second, IEEE 802.1x and MAC authentication to the internal RADIUS server is supported, because there is a RADIUS server running on each managed network device. Moreover, user credentials and/or certificate files are also stored locally on each managed network device (e.g., access point). The managed network device uses the loopback address (e.g., 127.0.0.1) to perform Extensible Authentication Protocol (EAP) authentication and is independent of the type of IP address assigned to the managed network device.

Third, when an SSID that bridges traffic between the wireless client devices and the wired network, no data frames need to pass through any managed network device. Also, it is not necessary for the data frames to be on the default virtual local area network (VLAN) of the managed network device. Therefore, the fact that the managed network devices in the autonomous WLAN use reserved IP addresses for internal communication (e.g., "169.254.x.x") does not affect the client devices and the wired network which can use a different address space. Even if there are other devices on the network that use the same reserved address space, those devices will need to support the same conflict resolution protocol, and thus any conflicts will be automatically detected and resolved.

Fourth, wireless mesh can be supported because the reserved IP address space, such as "169.254.x.x," provides full IP connectivity between the managed network devices regardless of whether they are connected using wired or wireless links.

C. Additional Network Services Enabled by Virtual Controller

In some embodiments, to enable additional network services (such as RADIUS or Layer-3 forwarding), the administrator can configure a single IP address for the entire autonomous network (hereinafter "virtual controller IP") in the management interface. This IP address will only be located on one of the managed network devices in the WLAN and will be on the default (or native) VLAN. With the virtual controller enabled, the managed network devices (e.g., access points) can support an additional set of network services. For example:

First, SSIDs in bridge mode and on the default VLAN can access the management interface via the internal secured URL.

Second, the "private" type of SSID can additionally support access to the wired network by performing Layer-3 forwarding and Network Address Translation (NAT) between the wireless network and the wired network. Moreover, the client devices can communicate with network devices on the wired network and/or on the Internet, but their traffic will flow through the master access point or virtual controller which performs source NAT of their packets. This shields the wired network from risks such as broadcast storms and allows the network to support guest Internet access.

Third, the following additional authentication types can now be supported: (i) IEEE 802.1x to an external RADIUS server; (ii) MAC authentication to external RADIUS server; (iii) external captive portal; and (iv) internal captive portal for guest SSIDs and for bridge mode SSIDs on the default VLAN.

Fourth, external management systems can also be supported with virtual controller enabled in the network.

D. Example IP Assignment

FIG. 2 illustrates an example IP assignment according to embodiments of the present disclosure. FIG. 2 includes three columns—device 220, address type 240, and IP address 260. Note that IP assignment described herein is for illustration purposes only, other assignments can be used in light of the principles described herein. Referring now to FIG. 1A, controller 120 may be assigned a static IP address of "192.168.1.1;" server 130 may be assigned a static IP address of "192.168.1.4;" network printer 148 may be assigned a static IP address of "192.168.1.3;" etc.

Moreover, in one embodiment, where access point 146 is elected to be the virtual controller for the network, access point 146 is assigned both a virtual controller IP, which is an externally assigned static IP address of "192.168.1.99," and an internal IP address of "169.254.a.b," which is self-assigned by access point 146 itself and can be used for control-path communications with other access points. In this embodiment, other access points that are not virtual controllers of the network use only self-assigned internal IP addresses in the reserved address space. For example, access point 144 has a self-assigned internal IP address of "169.254.c.d" and access point 146 has a self-assigned internal IP address of "169.254.e.f." In some embodiments, each internal IP address is derived from a one-way hash of the media access control (MAC) address associated with each managed network device, which uniquely identifies each managed network device in the WLAN.

It shall be noted, however, that a virtual controller does not necessarily exist in the WLAN. Thus, in some embodiments, where no virtual controller exists in the WLAN, access point 142 may only have a self-assigned internal IP address of "169.254.a.b" without any static virtual controller IP.

Also, when virtual controller exists in a WLAN, additional network services may be provided. For example, a RADIUS server may be present in the network and configured with a static IP address (e.g., "196.168.1.4"). In addition, a captive server may also be present in the network and configured with another static IP address (e.g., "196.128.1.5").

A wireless client device (e.g., client device 162 in FIG. 1A) on a guest SSID may be configured as follows when additional network services are enabled through a virtual controller:

---
Authentication: External captive portal server 192.168.1.5
IP assigned by built-in DHCP server: 172.16.11.250
Gateway: 172.16.11.1
Management URL: https://instant.arubanetworks.com

---

A wireless client device (e.g., client device 164 in FIG. 1A) on an SSID in bridge mode may be configured as follows when additional network services are enabled through a virtual controller:

---
Authentication: 802.1x to RADIUS server at 192.168.1.4
IP assigned by DHCP server 192.168.1.1: 192.168.1.250
Gateway: 192.168.1.1
VLAN: Default
Management URL: https://instant.arubanetworks.com

---

Device Abstraction Process

Figure 3A:
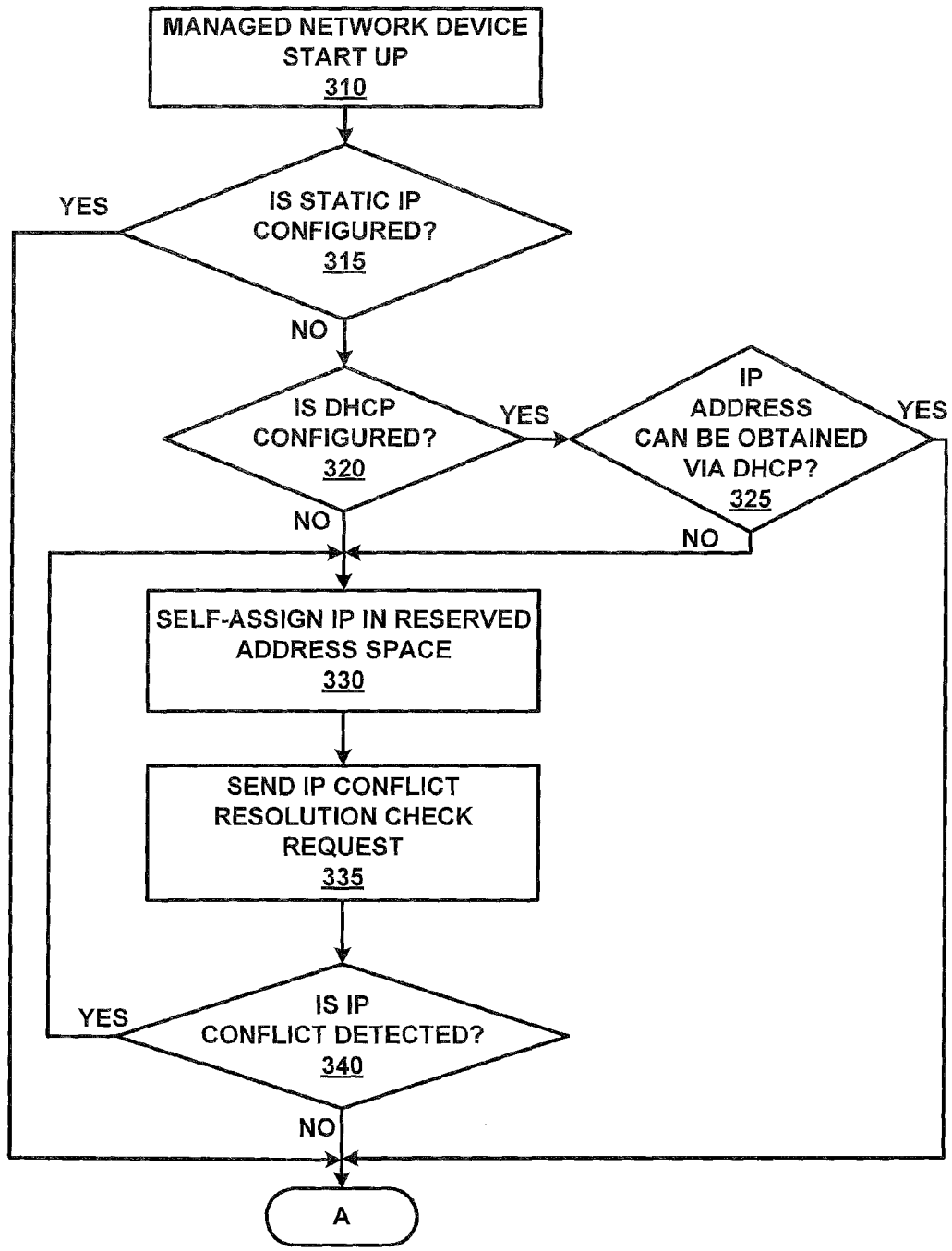
FIG. 3A shows a flowchart illustrating an exemplary device abstraction process according to embodiments of the present disclosure.
Figure 3B:
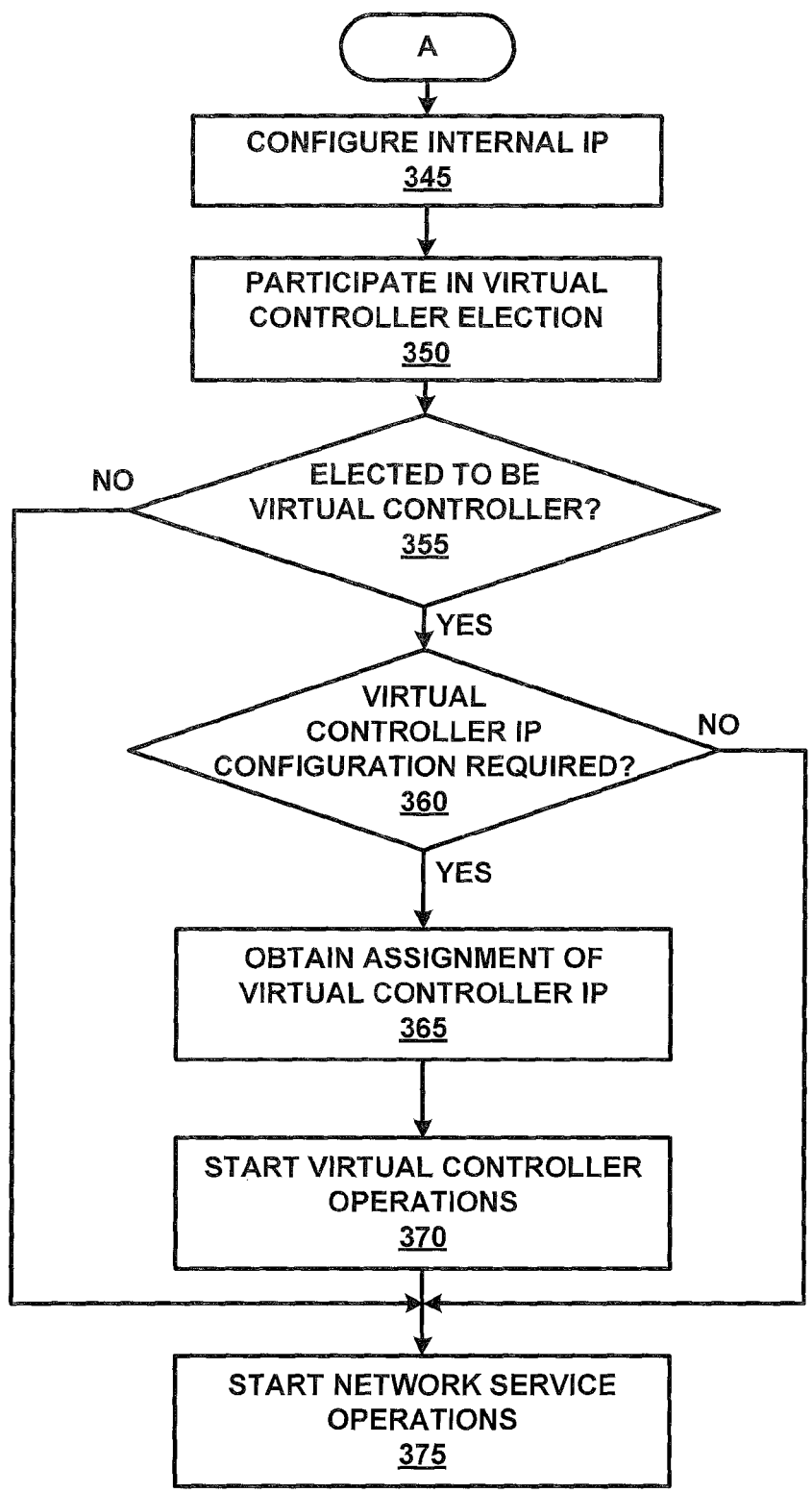
FIG. 3B shows a flowchart illustrating a continuation of the exemplary device abstraction process illustrated in FIG. 3A according to embodiments of the present disclosure.

FIGS. 3A and 3B illustrate an exemplary device abstraction process according to embodiments of the present disclosure. During operation, a managed network device such as an access point boots up (operation 310). The disclosed system determines whether a static IP address is configured for the managed network device (operation 315). If so, the system will use the static IP address, which is typically manually configured by a network administrator, as the IP address for the managed network device.

If no static IP address is configured for the managed network device, the disclosed system further determines whether a DHCP service is configured for the managed network device (operation 320). If the DHCP service is configured, then the disclosed system check whether an IP address can be obtained from the DHCP service (operation 325). If so, the system uses the IP address obtained from the DHCP service as the IP address for the managed network device.

If no DHCP service is available and no static IP address is configured for the managed network device, then the managed network device will self-assign an IP address in the reserved address space for internal network communications (operation 330). The managed network device then send an IP address conflict check request (operation 335), such as an address resolution protocol (ARP) request, to other managed network device(s) which also self-assigned internal IP address(es) within the same reserved address space. The managed network device then determines whether an IP address conflict is detected (operation 340). If the IP address conflict is detected, the managed network device backs off from the previously self-assigned IP address, and repeats self-assigning an IP address by choosing another IP address within the same reserved address space to assign to itself (operation 330). In some embodiments, the managed network device calculates a hash of its own media access control (MAC) address and determines its self-assigned IP address based on the hash result. If the managed network device detects an IP address conflict, the managed network device will calculate another hashed IP address based on its MAC address. The managed network device repeats the self-reassignment process until the no conflict is detected between the chosen IP address and the internal IP addresses of other managed network devices in the network.

Referring now to FIG. 3B, the managed network device subsequently configures its internal IP address using the self-assigned IP address in the reserved address space (operation 345). In some embodiments, the managed network device, together with other managed network devices in the network, perform a virtual controller election (operation 350). The managed network device then determines whether it is elected as the virtual controller for the network (operation 355). If so, the managed network device checks whether a virtual controller IP configuration is required by the network (operation 360). If so, the managed network device obtains an assignment of virtual controller IP (operation 365) and start virtual controller operation (operation 370). If the managed network device is not elected as the virtual controller, or if virtual controller IP configuration is not mandated by the network, the managed network device will start its network service operations, e.g., access point operations (operation 375).

Device Abstraction System

Figure 4:
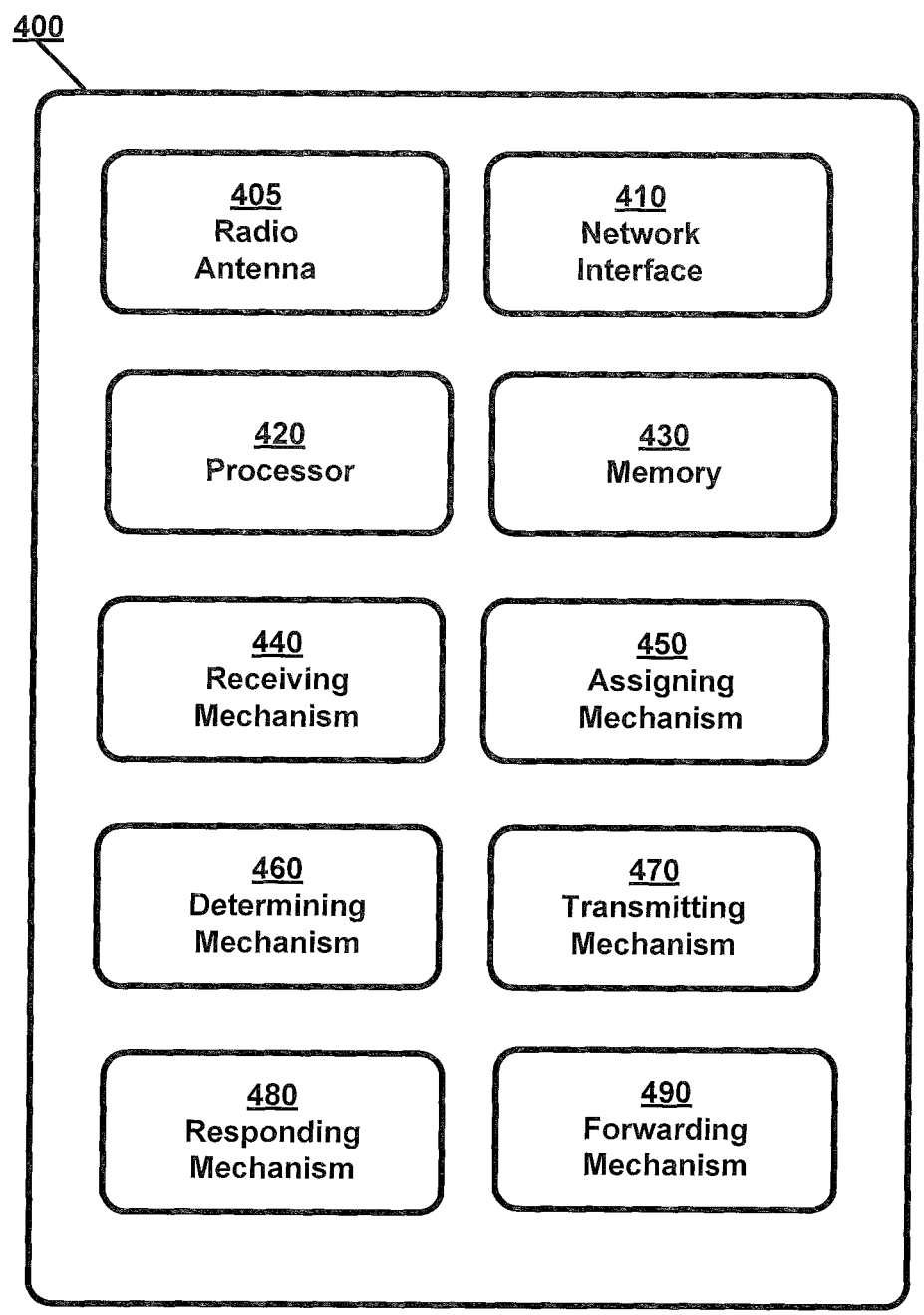
FIG. 4 shows a block diagram illustrating a system for device abstraction process according to embodiments of the present disclosure.

FIG. 4 is a block diagram illustrating a system for device abstraction according to embodiments of the present disclosure. Operating as a node in a wireless digital network, managed network device 400 includes at least one or more radio antennas 405 capable of either transmitting or receiving radio signals or both, a network interface 410 capable of communicating to a wired or wireless network, a processor 420 capable of processing computing instructions, and a memory 430 capable of storing instructions and data. Moreover, managed network device 400 further includes a receiving mechanism 440, an assigning mechanism 450, a determining mechanism 460, a transmitting mechanism 470, a responding mechanism 480, and a forwarding mechanism 490, all of which are coupled to the processor and the memory in managed network device 400. Managed network device 400 may be used as a client system, or a server system, or may serve both as a client and a server in a distributed or a cloud computing environment.

Radio antenna 405 may be any combination of known or conventional electrical components for receipt of signaling, including but not limited to, transistors, capacitors, resistors, multiplexers, wiring, registers, diodes or any other electrical components known or later become known.

Network interface 410 can be any communication interface, which includes but is not limited to, a modem, token ring interface, Ethernet interface, wireless IEEE 802.11 interface, cellular wireless interface, satellite transmission interface, or any other interface for coupling network devices.

Processor 420 can include one or more microprocessors and/or network processors. Memory 430 can include storage components, such as, Dynamic Random Access Memory (DRAM), Static Random Access Memory (SRAM), etc. In one embodiment, memory 430 stores one or more internal IP addresses, where each internal IP address is uniquely associated with a managed network device within a wireless local area network (WLAN). The virtual controller can be either a physical or a logical entity capable of processing a set of functionalities in a wireless mesh network. In one embodiment, the internal IP address is derived from a one-way hash of the media access control (MAC) address associated with the managed network device, which uniquely identifies the managed network device in the WLAN.

Receiving mechanism 440 receives one or more network frames via network interface 410. The received network frames may include, but are not limited to, requests and/or responses, beacon frames, management frames, control path frames, and so on, as described in the present disclosure. In some embodiments, receiving mechanism 440 can receive an assignment of a virtual controller IP address for managed network device 400 in response to managed network device 400 being elected as a virtual controller for the wireless network.

Assigning mechanism 450 assigns an internal IP address to managed network device 400 in an address space reserved for internal network communications within a wireless network. In some embodiments, assigning mechanism 450 assigns the internal IP address in absence of a DHCP service. Specifically, in one embodiment, assigning mechanism 450 assigns the address in response to determining that an IP address is not obtainable from the DHCP service. In some embodiments, assigning mechanism 450 assigns the internal IP address in response to no static IP being configured for managed network device 400. In some embodiments, in response to an IP address conflict is detected between managed network device 400 and other managed network devices, assigning mechanism 450 re-assigns a different internal IP address in the same reserved address space for internal network communications to managed network device 400. Specifically, assigning mechanism 450 can perform a hash of a media access control (MAC) address associated with managed network device 450 and derive the internal IP address from the hash result.

Determining mechanism 460 can determine whether a static IP address is configured for managed network device 400. Furthermore, determining mechanism 460 can determine whether a DHCP service is configured for managed network device 400. In one embodiment, in response to the DHCP service being configured for managed network device 400, determining mechanism 460 can also determine whether an IP address is obtainable from the DHCP service. In some embodiments, determining mechanism 460 can determine whether an IP address conflict exists between managed network device 400 and other managed network devices in the same WLAN. Specifically, determining mechanism 460 checks for IP address conflicts by sending out an Address Resolution Protocol (ARP) request to other managed network devices which also self-assign IP addresses within the same reserved address space for internal network communications. In addition, determining mechanism 460 can determine whether managed network device 400 is elected as a virtual controller for the wireless network.

Transmitting mechanism 470 transmits a network frame, including but not limited to, a control path frame or a response to a control path frame, a management frame or a response to a management frame, a network traffic frame received from wireless client devices, and so on. In some embodiments, transmitting mechanism 470 broadcasts or multicasts the network frame. In other embodiments, transmitting mechanism 470 transmits the network frame to a specific network device such as an access point, a controller, a router, or any other types of network devices. In some embodiments, transmitting mechanism 470 transmits the network frame via a wireless network interface or a radio antenna, e.g. when managed network device 400 communicates with other managed network devices in the wireless network. In other embodiments, transmitting mechanism 470 transmits the network frame via a wired network interface, e.g., when managed network device 400 forwards network traffic received from wireless client devices to a wired network.

Responding mechanism 480 can respond to a network frame received from another network device based on assigned internal IP address in the reserved address space. Specifically, in some embodiments, responding mechanism 480 responds to the network frame by responding to a control path frame received from another managed network device which also has a self-assigned internal IP address within the same reserved address space. The control path frame may include a source IP address, which corresponds to the other managed network device, and a destination IP address, which corresponds to the internal IP that is self-assigned by assigning mechanism 450. In some embodiments, responding mechanism 480 responds to the network frame by responding to a management frame from the other network device such that the other network device can configure, monitor, and/or manage the managed network device through a management interface. In one embodiment, the other network device is connected to a wired network and is assigned an IP address outside the reserved address space.

Collectively operating with the receiving mechanism 440, assigning mechanism 450, determining mechanism 460, transmitting mechanism 470, and responding mechanism 480, forwarding mechanism 490 can forward network traffic from wireless client devices to a wired network, which managed network device 400 is coupled to via network interface 410.

According to embodiments of the present disclosure, network services provide by managed network device 400 include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc. Note that, in some embodiments, to enable a subset of the above network services (such as RADIUS or Layer-3 forwarding), a system administrator can configure a single IP address for the entire autonomous wireless network through a management interface. This single IP address will be located only on one of the managed network devices in the WLAN, which is elected to be the virtual controller for the wireless network and which will be on the default (or native) virtual local area network (VLAN). With the virtual controller enabled, all managed network devices (e.g., access points) in the wireless network can support the subset of network services at least in part through communication exchange of multiple control path frames.

The present disclosure may be realized in hardware, software, or a combination of hardware and software. As understood by the art, the hardware platforms as disclosed in the present disclosure may operate under control of target software running under a LINUX-variant operating system, or other operating system suitable for embedded devices. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "access point" (AP) generally refers to receiving points for any known or convenient wireless access technology which may later become known. Specifically, the term AP is not intended to be limited to IEEE 802.11-based APs. APs generally function to allow wireless devices to connect to a wired network via various communications standards.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. The description is this to be regarded as illustrative rather than limiting.

The invention claimed is:

1. A non-transitory computer-readable storage medium storing embedded instructions that are executed by one or more mechanisms implemented within an access point to perform a plurality operations comprising:

transmitting, by an access point in a plurality of access points to other access points in the plurality of access points, an Internet Protocol (IP) address conflict check request to determine if any of the other access points are using a particular IP address within a reserved address space;

in response to the particular IP address being used by one of the other access points: selecting, by the access point, a second IP address with the reserved address space for self-assigning to the access point;

in response to the particular IP address not being used by one of the other access points: self-assigning, by the access point, the particular IP address within the reserved address space;

communicating with the other access points using the particular IP address within the reserved address space for control path communications; and communicating with the other access a different IP address that is externally assigned and outside the reserved address space while operating as a virtual network controller for the plurality of access points.

2. The non-transitory computer-readable storage medium of claim 1, wherein the particular IP address is an internal IP address in a link local address space.

3. The non-transitory computer-readable storage medium of claim 1, wherein each of the plurality of other access points uses a self-assigned IP address.

4. The non-transitory computer-readable storage medium of claim 3, wherein each of the access points uses the self-assigned IP address while providing network access to one or more client devices.

5. The non-transitory computer-readable storage medium of claim 1, wherein the plurality of operations further comprising:

responding to a control path frame or a management network frame received by the access point from another access point in the plurality of access points based on the self-assigned internal IP address in the link local address space, wherein the other access point in the plurality of access points is assigned another IP address outside the link local address space.

6. The non-transitory computer-readable storage medium of claim 5, wherein the plurality of operations further comprising:

determining whether the access point is elected as a network controlling device for the plurality of access points in the wireless network; and responsive to the access point being elected as the network controlling device, receiving a global IP address assignment for the network controlling device.

7. A network device serving as an access point in a plurality of access points comprising:

a processor;

a network interface;

a transmitting mechanism coupled to the processor, the transmitting mechanism transmitting to other access points in the plurality of access points an Internet Protocol (IP) address conflict check request to determine if any of the other access points are using a particular IP address within a reserved address space;

a selecting mechanism coupled to the processor, the selecting mechanism selecting a second IP address within the reserved address space for self-assigning to the access point in response to the particular IP address being used by one of the other access points;

an assigning mechanism coupled to the processor, the assigning mechanism self-assigning the particular IP address within the reserved address space in response to the particular IP address not being used by one of the other access points; and a communicating mechanism coupled to the process, the communicating mechanism communicating with the other access points using the particular IP address within the reserved address space for control path communications and communicating with the other access points using a different IP address that is externally assigned and outside the reserved address space while operating as a virtual network controller for the plurality of access points.

8. The network device of claim 7, wherein the particular IP address is an internal IP address in a link local address space.

9. The network device of claim 7, wherein each of the plurality of other access points uses a self-assigned IP address.

10. The network device of claim 9, wherein each of the access points uses the self-assigned IP address while providing network access to one or more client devices.

11. The network device of claim 7, wherein the transmitting mechanism further to respond to a control path frame or a management network frame received by the access point from another access point in the plurality of access points based on the self-assigned internal IP address in the link local address space, wherein the other access point in the plurality of access points is assigned another IP address outside the link local address space.

12. The network device of claim 11, further comprising:

a receiving mechanism coupled to the processor, the receiving mechanism to receive a global TP address assignment for the network controlling device in response to the access point being elected as the network controlling device, wherein the determining mechanism further to determine whether the access point is elected as a network controlling device for the plurality of access points in the wireless network.

13. The network device of claim 12, wherein the global IP address comprises a static IP address, and wherein the self-assigned IP address comprises an internal IP address.

14. The network device of claim 12, wherein the network controlling device provides one or more of following services:

an Institute of Electrical and Electronics Engineers (IEEE) 802.1x authentication to an internal and/or external Remote Authentication Dial-In User Service (RADIUS) server;

an MAC authentication to an internal and/or external RADIUS server;

a built-in Dynamic Host Configuration Protocol (DHCP) service to assign wireless client devices IP addresses;

an internal secured management interface; Layer-3 forwarding;

Network Address Translation (NAT) service between the wireless network and a wired network coupled to the network device;

an internal and/or external captive portal; and an external management system for managing the network devices in the wireless network.

15. A non-transitory computer-readable storage medium storing embedded instructions that are executed by one or more mechanisms implemented within an access point to perform a plurality of operations comprising:

transmitting an IP address conflict check request to other access points in the plurality of access points in a reserved address space;

in response to the IP address conflict being detected by an access point among a plurality of access points in a wireless network, self-assigning an internal Internet Protocol (IP) address in the reserved address space, wherein the plurality of access points are self-assigned with a plurality of internal IP addresses in the reserved address space;

in response to the particular IP address being used by one of the other access points, selecting a second IP address within the reserved address space for self-assigning to the access point;

communicating with the other access points using the particular IP address within the reserved address space for control path communications; and communicating with the other access points using a different IP address that is externally assigned and outside the reserved address space while operating as a virtual network controller for the plurality of access points.

16. The non-transitory computer-readable storage medium of claim 15, wherein the internal IP address comprises an Internet Protocol version 4 (IPv4) address or an Internet Protocol version 6 (IPv6) address.

17. The non-transitory computer-readable storage medium of claim 15, wherein the network frame is a management frame received from a second access point, and wherein the second access point is assigned an IP address outside the link local address space.

18. The non-transitory computer-readable storage medium of claim 17, wherein the assigned IP address corresponds to a destination IP address in the network frame, and wherein the network frame comprises a source IP address in the link local address space that is assigned to the second access point.

19. The non-transitory computer-readable storage medium of claim 15, further comprising:

a forwarding mechanism coupled to the processor, the forwarding mechanism to forward the network traffic from wireless client devices to a wired network coupled to the network device.

20. The non-transitory computer-readable storage medium of claim 15, wherein access points in the wireless network that are self-assigned with internal IP addresses within the link local address space are managed using a single IP address through the access point elected as the network controlling device.

* * * * *